(12) United States Patent
Gullen et al.

(10) Patent No.: US 6,799,167 B1
(45) Date of Patent: Sep. 28, 2004

(54) DYNAMIC PORTFOLIO BENCHMARKING

(75) Inventors: David Gullen, San Francisco, CA (US); Lee Epstein, San Francisco, CA (US); Christopher Stoddart, Woodside, CA (US)

(73) Assignee: Decision Analytics, Inc., San Francisco, CA (US)

( * ) Notice: Subject to any disclaimer, the term of this patent is extended or adjusted under 35 U.S.C. 154(b) by 0 days.

(21) Appl. No.: 09/425,128

(22) Filed: Oct. 22, 1999

(51) Int. Cl.$^7$ ............................................... G06F 17/60
(52) U.S. Cl. ........................................ 705/36; 705/35
(58) Field of Search .................................... 705/36, 35

(56) References Cited

U.S. PATENT DOCUMENTS

| | | | | |
|---|---|---|---|---|
| 5,761,442 A | * | 6/1998 | Barr et al. | 395/236 |
| 5,799,287 A | * | 8/1998 | Dembo | 705/36 |
| 5,819,238 A | * | 10/1998 | Fernholz | 705/36 |
| 5,918,217 A | * | 6/1999 | Maggioncalda et al. | 705/36 |
| 6,003,018 A | * | 12/1999 | Michaud et al. | 705/36 |
| 6,012,044 A | * | 1/2000 | Maggioncalda et al. | 705/36 |
| 6,021,397 A | * | 2/2000 | Jones et al. | 705/36 |
| 6,125,355 A | * | 9/2000 | Bekaert et al. | 705/36 |
| 6,240,399 B1 | * | 5/2001 | Frank et al. | 705/36 |
| 6,275,814 B1 | * | 8/2001 | Giansante et al. | 705/36 |

FOREIGN PATENT DOCUMENTS

WO  WO 96/06402  * 2/1996 ........... G06F/17/60

OTHER PUBLICATIONS

Dahlquist et al., "Evaluating portfolio performance with stochastic discount factors", The Journal of Business; Chicago; Jul. 1999.*

Zargham et al., "A Web–based information system for stock evaluation", Advance Issues of E–Commerce and Web–Based Information Systems, WECWIS, 1999, International Conference on Apr. 8–9, 1999, Santa Clara, CA, pp. 81–83.*

Moody, J. Lizhong Wu, "Optimization of trading systems and portfolios", CSE Dept., Oregon Graduate Inst., Portland, OR, Computational Intelligence for Financial Engineering, 1997., proceedings of the IEEE/IAFE 1997, Mar. 24–25, 1997, New York City, NY.*

Investorhome (WebPages from website, www.investor-home.com/process.html/, marked pp. 1–11, extracted on Internet on Apr. 18, 2001).*

Webpage, "Asset Allocation and Portfolio Performance", from website http://www.business2business.on.ca/magazine/dec95/b2b_doll.html; pp. 1–2, published in Dec. 95, extracted from Internet on Apr. 10, 2001.*

Dahlquist et al., "Evaluating portfolio performance with stochastic discount factors", The Journal of Business; Chicago; Jul. 1999.*

Zargham et al., "A Web–based information system for stock evaluation", Advance Issues of E–Commerce and Web–Based Information Systems, WECWIS, 1999, International Conference on Apr. 8–9, 1999, Santa Clara, CA, pp. 81–83.*

(List continued on next page.)

Primary Examiner—Jeffrey A. Smith
Assistant Examiner—Y. C. Garg
(74) Attorney, Agent, or Firm—Donald J. Lenkszus

(57) ABSTRACT

A benchmark portfolio is provided to be customizable to an investment portfolio where the customization is dynamic. Each customization can be recorded as a historical event, and the investment return of the benchmark portfolio is based on the recorded customizations. The benchmark portfolio includes select asset classes, which include a sweep account, where each asset class includes at least one security that is representative of a set of specifically screened securities within the asset class.

27 Claims, 7 Drawing Sheets

OTHER PUBLICATIONS

Moody, J. Lizhong Wu, "Optimization of trading systems and portfolios", CSE Dept., Oregon Graduate Inst., Portland, OR, Computational Intelligence for Financial Engineering, 1997., proceedings of the IEEE/IAFE 1997, Mar. 24–25, 1997, New York City, NY.*

William F.Sharpe, "Asset Allocation: Management Style And Performance Measurement", The Journal of Portfolio management, Winter 1992, pp 7–19.*

Dahlquist et al., "Evaluating portfolio performance with stochastic discount factors", The Journal of Business; Chicago; Jul. 1999.*

* cited by examiner

DYNAMIC PORTFOLIO BENCHMARKING

FIELD OF THE INVENTION

This invention relates, in general, to investments in securities, and more particularly, to the evaluation of investment portfolios.

BACKGROUND OF THE INVENTION

Indices, such as indices for 28-day municipal bonds and 90-day commercial paper, are commonly used to evaluate the investment return of an individual's investment portfolio. One problem with these indices is that they are not suitable for a direct comparison of the investment portfolio because each of these indices indicate an average return for the entirety of investments in the index, and the indices are not based upon a mix of assets in an investor's investment portfolio. For example, the 28-day municipal bond index indicates the return for only the 28-day municipal bond market. However, it is unlikely for an individual's investment portfolio to contain investments in only a single class of investments. Therefore, the investor must segregate the investment portfolio to include only those investments that fall within the class of investments represented by the index before making the comparison. Additionally, individual comparisons of different portions of the investment portfolio must be made with different indices to evaluate the entire investment portfolio, which is a complicated and time consuming process. Furthermore, it is also difficult to evaluate the entire investment portfolio as a whole when using this method of evaluation.

Moreover, even if an individual's investment portfolio only contains investments within a single class of investments represented by a particular index, the index is still not an accurate reflection of an average investment return for that class of investment. The inaccuracy results from the fact that, during each business day, an index represents a different set of investments within the investment class because the investments in the index are exchanged on a daily basis. However, a typical investor does not sell and then buy all of his or her investments each and every business day.

Accordingly, a need exists for a more convenient and more accurate evaluation or benchmarking of an investment portfolio.

SUMMARY OF THE INVENTION

In accordance with the principles of the present invention, a benchmark portfolio is provided to be customizable to an investment portfolio such that the benchmark portfolio tracks various investment changes made by an investor over time. Further in accordance with the principles of the present invention, the customization is dynamic. Still further in accordance with the principles of the present invention, each customization can be recorded as a historical event. Yet further in accordance with the principles of the present invention, the investment return of the benchmark portfolio is based on the recorded customizations. Additionally in accordance with the principles of the present invention, the benchmark portfolio includes select asset classes, which include a sweep account, where each asset class includes at least one security that is representative of a set of specifically screened securities within the asset class.

BRIEF DESCRIPTION OF THE DRAWING

The present invention will be better understood from a reading of the following detailed description, taken in conjunction with the accompanying drawing figures in which.

For simplicity and clarity of illustration, descriptions and details of well-known features and techniques are omitted to avoid unnecessarily obscuring the present invention, and the same reference numerals in different figures denote the same elements.

DETAILED DESCRIPTION

Figure 1:
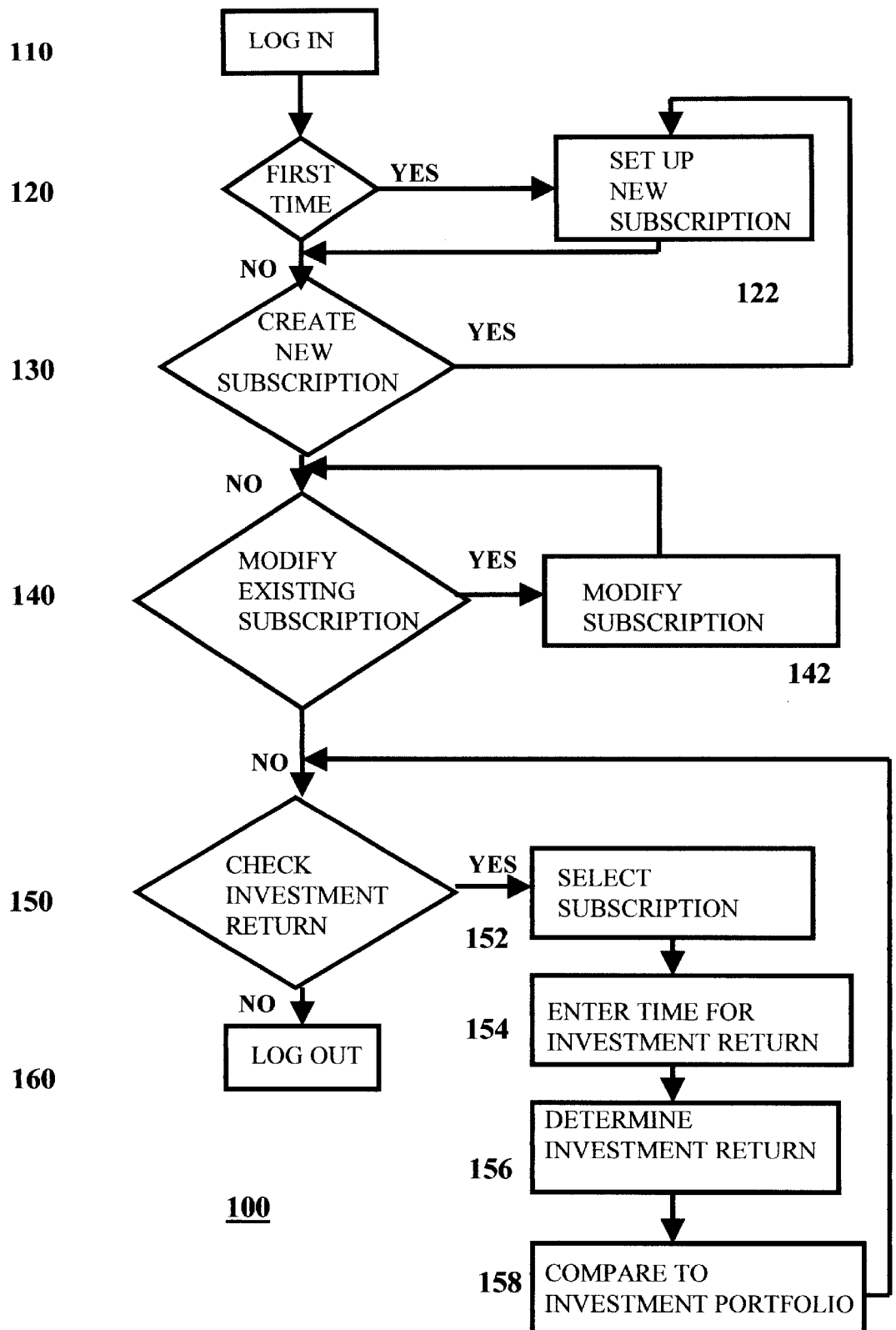
FIG. 1 illustrates a flow chart of an embodiment for benchmarking an investment portfolio in accordance with the present invention.

FIG. 1 illustrates a flow chart of a method 100 for benchmarking an investment portfolio. As an example, method 100 can be implemented through an investment management system or a computer program accessible over the world wide web of computers known as the Internet. In the example of a computer program, a user of the computer program logs in to access the program at a step 110. The log in process can include supplying a user identification and a password.

At a step 120, a decision is made as to whether the user has used this computer program before. If this log in session is the user's initial session, then the user will establish or set up a new subscription in the user's benchmark portfolio at a step 122. A subscription is a portfolio that is customized specifically to accurately benchmark the user's actual investment portfolio. Each benchmark portfolio can be unique for each user, and as explained in more detail hereinafter, each benchmark portfolio can include a plurality of subscriptions that correspond to a user's plurality of investment portfolios.

If the user has used this computer program before, then the user has an option to create a new subscription at a step 130. If the user selects this option, then the user sets up a new subscription in step 122, which is described in more detail hereinafter. If the user chooses not to create a new subscription, then the user decides whether to modify an existing subscription in a step 140. A modification can be made in a step 142, which is saved in a history file as explained in more detail hereinafter.

If no modification is desired, then the user decides whether to check the performance or investment return of his or her benchmark portfolio at a step 150. If a determination of the investment return is not desired at this time, then the user can log out of the computer program at a step 160. However, if a determination of the investment return is desired, then a particular subscription is selected in a step 152, and a time period for the investment return determination is entered at a step 154. The determination or calculation of the investment return is performed in a step 156, which is based on the entire allocation history of the subscription as explained in more detail hereinafter. An optional comparison of the investment return for the subscription can be made to the investment return of the user's investment portfolio at a step 158. As explained in more detail hereinafter, this comparison can be made directly to the investment return of the user's entire investment portfolio without requiring any additional calculations and without using additional benchmarks or indices.

Figure 2:
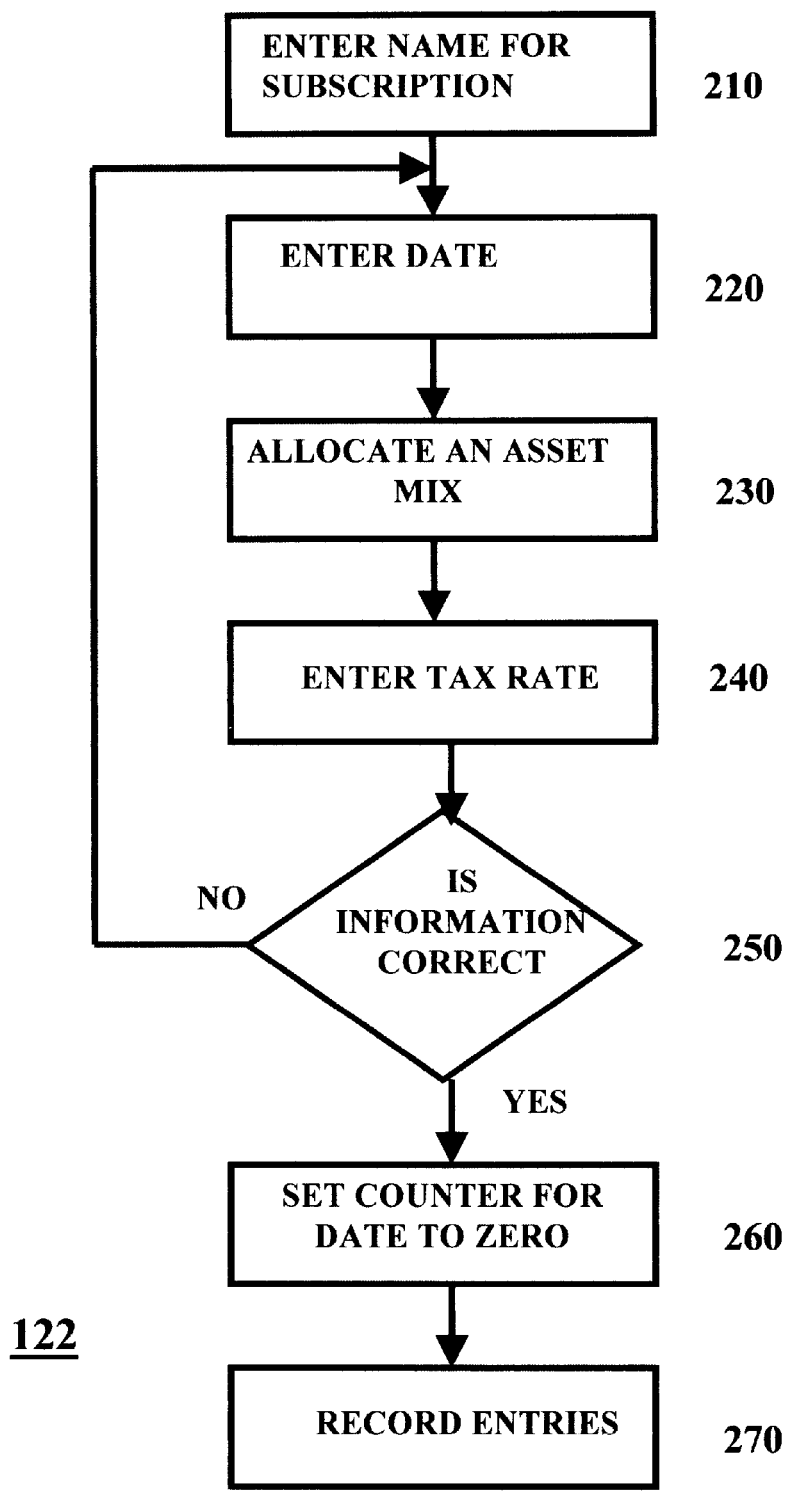
FIGS. 2 through 6 illustrate more detailed flow charts or block diagrams of different aspects of the benchmarking process of FIG. 1 in accordance with the present invention.

FIG. 2 illustrates a more detailed flow chart of setting up a new subscription in step 122 of the benchmarking process in FIG. 1. This process or subroutine creates or establishes a subscription in the benchmark portfolio that is customizable to an user's actual investment portfolio.

In FIG. 2, the user enters a name for the new subscription at a step 210 and enters a date for the new subscription at a step 220. Then, the user allocates or selects an asset mix from a plurality of predetermined asset classes at a step 230. The determination of the plurality of asset classes is explained in more detail hereinafter. The asset mix should represent 100 percent of the subscription. As an example of an implementation of step 230, a graphic user interface can list the plurality of predetermined asset classes and have buttons to increase or decrease the allocations of the individual asset classes from zero to one hundred percent.

Next, the user enters his or her tax rate at a step 240. As an example, the tax rate can be the user's federal tax rate, the user's state tax rate, or a combination of the federal and state tax rates. The tax rate is subsequently used during the determination of investment return.

At a step 250, the user verifies whether the information from steps 220 through 240 is correct. If errors are found, then the user returns to step 220. However, if no errors are found, then at a step 260, a counter for the date selected in step 220 is set to zero, and at a step 270, the entries or information is recorded in a history file.

Figure 3:
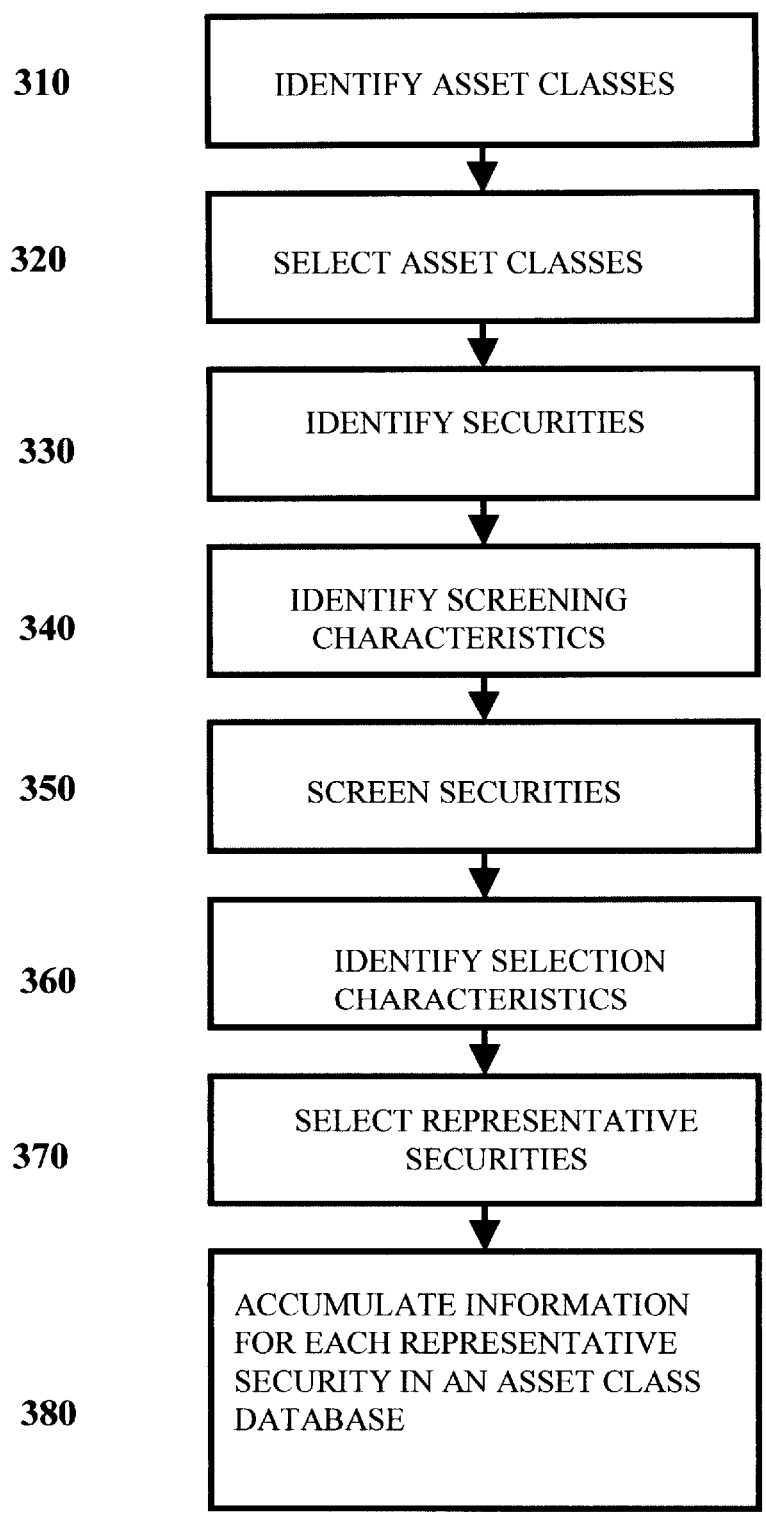

FIG. 3 illustrates a more detailed flow chart for a method 300 of determining the asset classes in a subscription for the benchmarking process of FIG. 1. At a step 310 in FIG. 3, all potential asset classes are identified, and at a step 320, a plurality or a subset of the asset classes are preferably selected to be used in the benchmark portfolio. In the preferred embodiment, all of the potential asset classes are not used in the benchmark portfolio in order to simplify the establishment and maintenance of the benchmark portfolio. The selected asset classes are preferably based on their popularity among investors. As an example, the selected asset classes can include: municipal securities, treasuries, commercial paper, corporate bonds, and repurchase agreements, which include sweep accounts and overnight money market accounts.

Next at a step 330, all potential securities within each of the selected asset classes are identified. In the preferred embodiment, all of the potential securities are not used in the benchmark portfolio in order to simplify the establishment and maintenance of the benchmark portfolio. Accordingly, screening characteristics for the securities within each of the selected asset classes are identified at a step 340. Examples of suitable screening characteristics include, but are not limited to, sectors, remaining maturity periods, and credit qualities. In the preferred embodiment, security yield is not a screening characteristic. In an alternative embodiment, the credit quality can be selected by the user when setting up a new subscription. At a step 350, the securities within each of the selected asset classes are screened based on the screening characteristics.

Then, at a step 360, selection characteristics for the screened securities within each of the selected asset classes are identified. Examples of suitable selection characteristics include, but are not limited to, issue sizes, geographic distributions, and amounts outstanding. The issue size is an indication of the size of the security relative to the total size of the market. The geographic distribution is preferably diverse; in the preferred embodiment, a national distribution is used. The amounts outstanding for each security are of particular importance for mortgage-backed securities.

At step 370, a plurality or a subset of the screened securities are selected based on the selection characteristics such that at least one of the screened securities is selected for each of the selected asset classes. In the preferred embodiment, the selected securities are representative of all of the screened securities in the asset class to which the selected security belongs. The preferred number of representative securities for each selected asset classes depends on the efficiency of the asset class. Efficiency is a measure of how well the market value of a particular security follows the average trend of the market values for all of the securities in a given asset class. For highly efficient asset classes such as treasuries, a single security can be representative of all of the screened securities in the selected asset class. For non-efficient asset classes such as municipal securities, a higher number of securities are needed to be representative of all of the screened securities in the selected asset class.

At a step 380, information for each selected security is accumulated in an asset class database. This database can be any commercially available investment accounting software. The software preferably handles all transactions, income, balances, and flows related to the selected security. The information to be accumulated includes information from Bloomberg Financial Services and historical daily price information. Depending on the type of investment accounting software used, translators or converters may be needed to translate or convert the output from the investment accounting software into a form compatible for use as a database.

Figure 4:
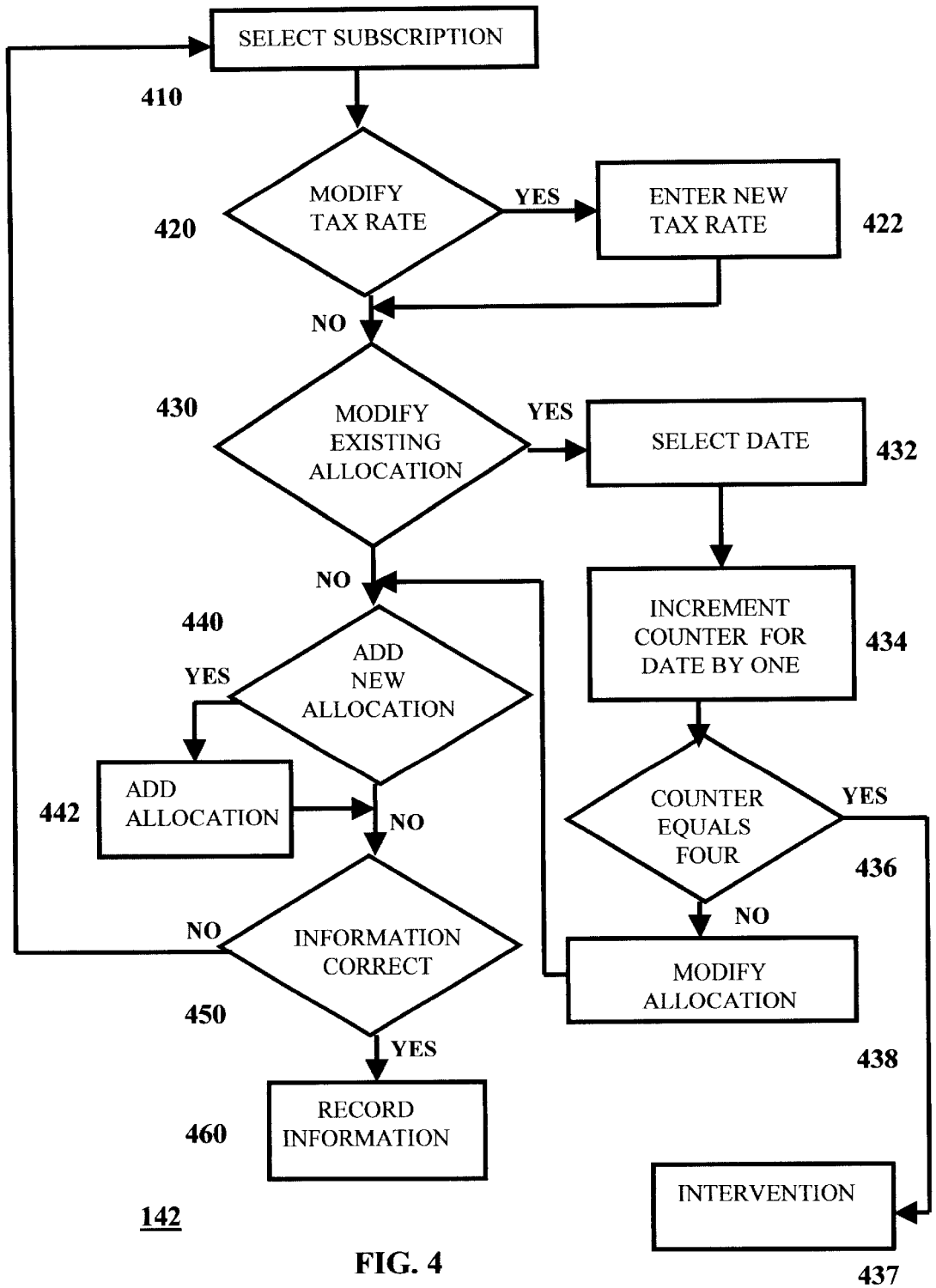

FIG. 4 illustrates a more detailed flow chart of modifying an existing subscription in step 142 of the benchmarking process in FIG. 1. The modification permits an allocation or reallocation of the selected asset classes in the benchmark portfolio that is preferably based on or associated with the actual allocation or reallocation of assets in the user's investment portfolio and that is also preferably based on or associated with the actual date of the actual allocation or reallocation of assets in the user's investment portfolio.

In FIG. 4, the user select a subscription at a step 410, and the user subsequently decides whether to modify the tax rate in a step 420, modify an existing allocation in a step 430, or add a new allocation in a step 440. If a new tax rate is desired, then the new tax rate can be entered in a step 422. If a new allocation representing, for example, a change of investment in the user's investment portfolio is desired, then a new allocation is added at a step 442. The addition process can be similar to steps 220 through 260 in FIG. 2.

However, if a modification of an existing allocation is desired, then the user selects a date of the existing allocation in a step 432, and the counter associated with that date is incremented by one at a step 434. At a step 436, the value of the counter is checked. If the value is less than four, then the user can modify the allocation in a step 438. The modification process can be similar to steps 230 through 250 in FIG. 2, and can include an option to delete an existing allocation or reallocation.

However, if the value of the counter associated with the selected date equals four, then the user is not permitted to modify the allocation. Instead, at a step 437, the owner of the computer program is notified that the user has previously modified the allocation three times and is attempting to modify the allocation a fourth time. This intervention is desired to prevent a user from only purchasing a single subscription to benchmark a plurality of investment portfolios. It is understood that the number triggering the intervention step can be greater or less than four, depending on the computer program owner's preference.

At a step 450, the user verifies whether the information is correct. If the information is not correct, then the user returns to step 410, but if the information is correct, then the information is recorded in a history file at a step 460.

Figure 5:
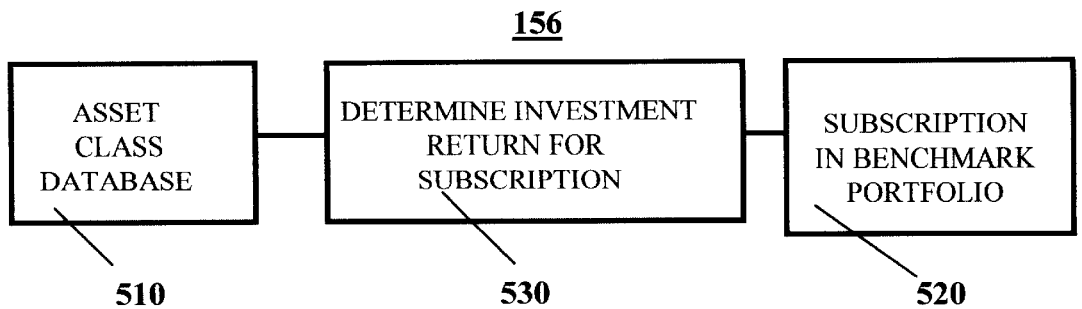

FIG. 5 illustrates a block diagram of an aspect of determining an investment return of a subscription in step 156 of the benchmarking process in FIG. 1. In FIG. 5, a database 510 of the selected asset classes containing the selected, screened securities is combined with information from a subscription 520 in the user's benchmark portfolio to determine an investment return 530 for the subscription. The investment return is based on the allocation of the selected asset classes and any reallocations of the selected asset classes that the user has added.

Two different types of investment return can be determined or calculated: a pre-tax investment return and a taxable equivalent investment return. The pre-tax investment return (PTIR) can be determined by the following equation:

$$PTIR = \frac{\Delta liquidation}{liquidation_{t=0}}$$

where $\Delta liquidation$ is the change in market price from an initial time where t=0 to the present time and where $liquidation_{t=0}$ is the market price at the initial time wherein t=0. The taxable equivalent investment return (TEIR) can be determined by the following equation:

$$TEIR = \frac{\Delta liquidation + TANPI - TAA}{liquidation_{t=0}}$$

where TANPI is the tax adjusted net period interest and where TAA is the tax adjusted amortization.

Figure 6:
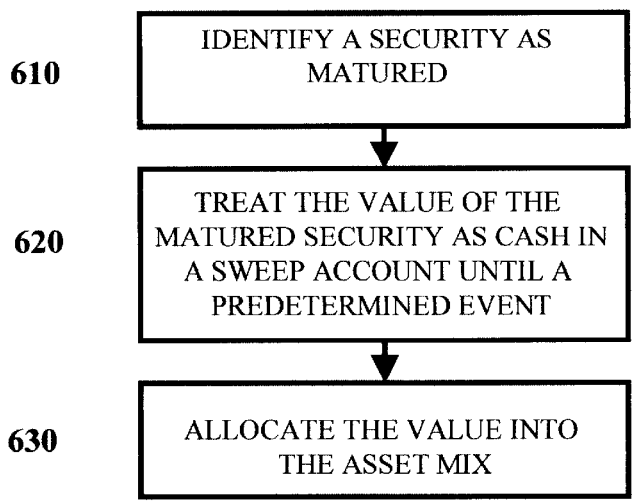

FIG. 6 illustrates a more detailed flow chart of a different aspect of calculating an investment return of a subscription in step 156 of the benchmarking process in FIG. 1. At step 610 in FIG. 6, a security in one of the selected asset classes allocated by the user is identified as being matured, and at a step 620, the value of the matured security is treated as cash in a sweep account or an overnight money market account until a predetermined event. The sweep account or overnight money market account is treated as a security with a fixed return rate. At a step 630, the value of the matured security that is treated as cash in a sweep account or an overnight money market account is allocated into the selected asset classes that are allocated by the user.

As an example, the predetermined event can be a fixed time period, a minimum size of the sweep account, or a reallocation of the selected asset classes. If the predetermined event is the reallocation of the selected asset classes, then step 630 includes allocating the value into the reallocated ones of the selected asset classes. If the predetermined event is the fixed time period or the minimum size, then step 630 includes allocating the value into the allocated ones of the selected asset classes.

Figure 7:
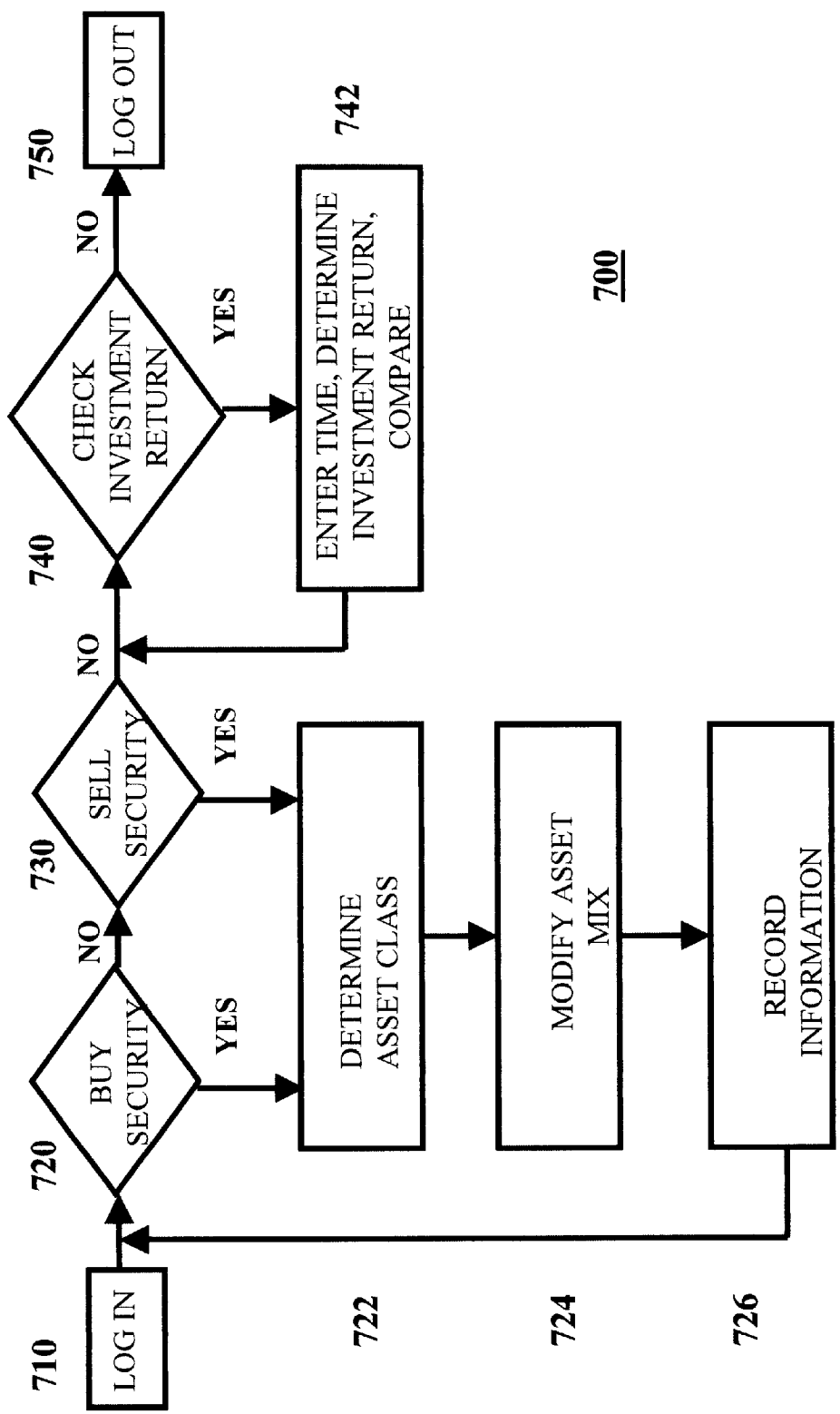
FIG. 7 illustrates a flow chart of a different embodiment for benchmarking the investment portfolio in accordance with the present invention.

FIG. 7 illustrates a flow chart of a method 700 for benchmarking an investment portfolio. Method 700 in FIG. 7 is similar to method 100 in FIG. 1. However, method 700 in FIG. 7 provides or creates a benchmarking portfolio that is dynamically or automatically customizable to changes in a user's investment portfolio while method 100 in FIG. 1 provides or creates a benchmarking portfolio that is statically customizable to changes in a user's investment portfolio. In the preferred embodiment, method 700 is implemented as a computer program that also permits the buying and selling of securities on the Internet, similar to a web-broker account. After a user logs in at a step 710 in FIG. 7, the user can buy securities at a step 720, sell securities at a step 730, check investment returns at a step 740, or log out at a step 750.

If the user buys or sells a security, the computer program dynamically or automatically determines the appropriate asset class in which the bought or sold security belongs at a step 722. The asset classes used in method 700 are established by a process similar to that described with reference to FIG. 3. After determining the appropriate asset class, the mix or allocation of the asset classes in the benchmark portfolio is dynamically or automatically modified to be the same as the current allocation of the user's actual investment portfolio at a step 724. The dynamic determination and dynamic modification in steps 722 and 724, respectively, can be performed instantaneously after the security is bought or sold or can be performed after a delay from when the security is bought or sold. If a delay is used, then the computer program for buying and selling the security can be separate from the computer program for the dynamic benchmarking.

Then, at a step 726, information associated with the new allocation of the asset classes in the benchmark portfolio is modified and is recorded in a history file. The recorded information is preferably similar to that described earlier with respect to FIG. 2.

If the user checks the investment return, the user enters a time, and the computer program determines and compares the investment returns of both the user's investment portfolio and the benchmark portfolio at a step 742. Details of the investment returns are preferably similar to those details described earlier with respect to FIGS. 5 and 6.

Figure 8:
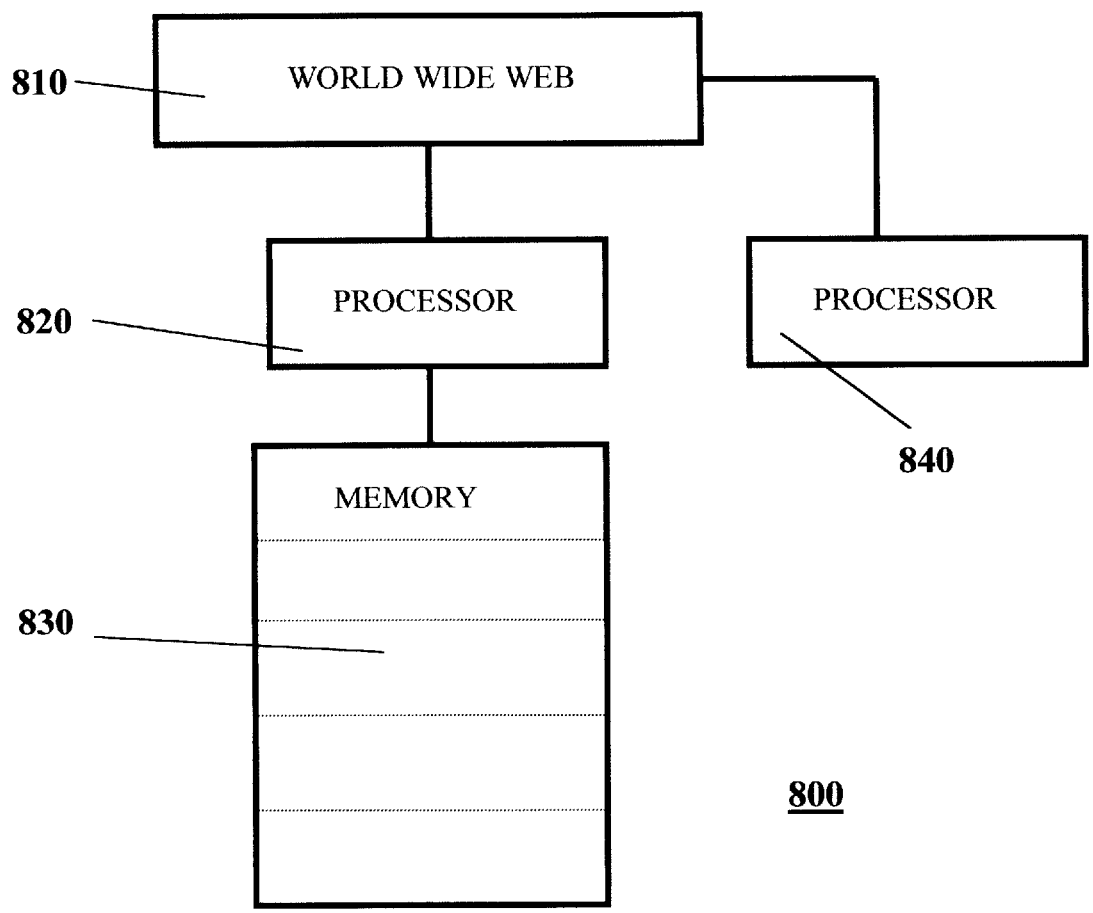
FIG. 8 illustrates a block diagram of a system for implementing a benchmarking system in accordance with the present invention.

FIG. 8 illustrates a block diagram of a system 800 for implementing the benchmarking system described herein. System 800 includes a processor 810 coupled to a memory 830. Memory 830 includes different portions for storing the software program, for storing the database of the asset classes, and for storing the history of the allocations. Processor 810 processes the database and the history based on instructions from the software program. Processor 820 is coupled to a world wide web 810, and a processor 840 is also coupled to the world wide web 810. Accordingly, a user or subscriber can use processor 840 to remotely access processor 820 and memory 830 through the world wide web 810.

Therefore, an improved benchmark for an investment portfolio is provided to overcome the disadvantages of the prior art. The benchmark portfolio and subscriptions disclosed herein are not mere prior art indices, but instead provide more convenient and more accurate evaluation for the benchmarking of an actual investment portfolio because the benchmark portfolio faces similar constraints as an actual investment portfolio. The benchmark and subscription are customizable to an investment portfolio and can be static or dynamic. Each customization is recorded as a historical event, and the investment return is based on the recorded customizations. The investment return is not determined by exchanging all securities on a daily basis, unless the user's investment portfolio is being reallocated on a daily basis. Furthermore, the benchmark portfolio includes select asset classes where each asset class includes at least one security that is representative of a set of specifically screened securities within the asset class.

The disclosure of the present invention described herein is enabled and can be realized and practiced without undue experimentation. Although the best mode of carrying out the present invention contemplated by the inventors is disclosed hereinabove, practice of the present invention is not limited thereto. Furthermore, while the present invention has been particularly shown and described with reference to specific embodiments, it will be understood by those skilled in the art that various changes may be made to the embodiments herein without departing from the spirit or scope of the present invention. For instance, although the embodiment of FIG. 7 illustrates the use of a single subscription, one skilled in the art will understand that the embodiment in FIG. 7 can be modified to include the use of a plurality of subscriptions.

Accordingly, the disclosure of the present invention is not intended to be limiting. Instead, the disclosure of the present invention is intended to be illustrative of the scope of the present invention. It is intended that the scope of the present invention shall be limited only to the extent required by the appended claims and the rules and principles of applicable law. The appended claims are not to be interpreted as including means-plus-function limitations, unless such a limitation is expressly recited in a given claim using the phrase "means for".

What is claimed is:

1. A method of providing a customized dynamic benchmark for an individual investment portfolio, comprising:
   utilizing a computerized system to perform the following steps:
      identifying asset classes
      selecting a subset of said asset classes based upon investment assets in said investment portfolio;
      screening securities within said subset of said asset classes;
      identifying efficiencies for representative securities in each said asset class;
      identifying preferred numbers of representative securities for each asset class in
   said subset of said asset classes, each of said preferred numbers is based on said efficiencies of corresponding securities in the corresponding asset class;
      selecting securities in accordance with said preferred numbers of said screened securities for each asset class for use in providing a benchmark portfolio, whereby performance of said individual investment portfolio is benchmarked with a customized benchmark;
      recording said selected securities; and
      selecting new selected securities when one of said investment securities is added to or sold from said investment portfolio and utilizing said selected new securities and said recorded securities to provide a benchmark for said investment portfolio whereby said benchmark tracks changes in said investment portfolio.

2. The method of claim 1, comprising:
   identifying predetermined screening characteristics for selecting said securities; and
   utilizing said screening characteristics in said screening step.

3. The method of claim 2, comprising:
   selecting said characteristics from a group comprising sectors, maturity periods, and credit qualities.

4. The method of claim 1, comprising:
   selecting said characteristics from a group comprising issue sizes, geographic distributions, and amounts outstanding.

5. The method of claim 1 comprising:
   dynamically allocating a plurality of asset classes to said benchmark portfolio from a change of said investment securities in said investment portfolio.

6. The method of claim 5, comprising
   selecting a subset of securities for each asset class of said plurality of asset classes to be representative of securities in the corresponding asset class in said investment portfolio.

7. The method of claim 5, comprising:
   determining an investment return for said plurality of asset classes allocated to said benchmark portfolio.

8. The method of claim 7, comprising:
   determining a pre-tax investment return for said plurality of asset classes allocated to said benchmark portfolio; and
   determining a taxable equivalent investment return for said benchmark portfolio.

9. The method of claim 7 wherein the step of determining the investment return comprises:
   identifying a security in an allocated one of said plurality of asset classes as matured;
   treating the value or said matured security as cash in a sweep account until a predetermined event; and
   allocating said value into allocated ones of said plurality of asset classes.

10. The method of claim 9, comprising:
    selecting said predetermined event from a group consisting of a fixed time period, a minimum size of said sweep account, and a reallocation of said plurality of asset classes.

11. The method of claim 7, comprising:
    comparing said investment return of said benchmark portfolio to an investment return of said investment portfolio.

12. The method of claim 5, comprising:
    identifying a first date associated with said allocation of said plurality of asset classes wherein said first date corresponds to a date on which a first allocation of asset classes in said investment portfolio occurred;
    reallocating said plurality of asset classes based on a reallocation of assets in said investment portfolio; and
    associating a second date with said reallocation of said plurality of asset classes wherein said second date corresponds to a date on which said reallocation of assets in said investment portfolio occurred.

13. The method of claim 12, comprising:
    recording said allocation of said plurality of asset classes, said reallocation of said plurality of asset classes, said first date, and said second date in a history.

14. The method of claim 13, comprising:
    determining an investment return of said benchmark portfolio based on said recorded allocation of said plurality of asset classes and said reallocation of said plurality of asset classes.

15. The method of claim 14, comprising:
    determining a pre-tax return of said benchmark portfolio based on said recorded allocation of said plurality of asset classes and said reallocation of said plurality of asset classes; and
    determining a taxable equivalent return of said benchmark portfolio based on said recorded allocation of said plurality of asset classes and said reallocation of said plurality of asset classes.

16. The method of claim 14, wherein said step of determining said investment return comprises:
    identifying a security in an allocated one of said plurality of asset classes as matured;

treating the value of said matured security as cash in a sweep account until a predetermined event; and allocating said value into said plurality of asset classes.

17. The method of claim 16, comprising:

selecting said predetermined event from the group consisting of a fixed time period, a minimum size of the sweep account, and the reallocation of said plurality of asset classes, wherein:

if said predetermined event is said reallocation of said plurality of asset classes, then said step of allocating said value further comprises allocating said value into said reallocated ones of said plurality of asset classes; and if said predetermined event is said fixed time period or said minimum size, then said step of allocating said value further comprises allocating said value into said allocated ones of said plurality of asset classes.

18. The method of claim 14, comprising:

comparing said investment return of said benchmark portfolio to an investment return of said investment portfolio based on said allocation of said plurality of assets and said reallocation of said plurality of assets.

19. A method of providing a customized dynamic benchmark for an individual investment portfolio, comprising:

utilizing a computerized system to perform the following steps:

selecting a subset of asset classes of securities based upon said individual investment portfolio;

identifying efficiencies for representative securities in each said asset class;

screening securities within each said subset based on sectors, remaining maturity periods, and credit qualities to provide screened securities; and selecting a subset of said screened securities based on one or more of issue sizes, geographic distributions, and amounts outstanding;

wherein, said subset of screened securities is further selected based upon said efficiencies and such that at least one security for each said subset of asset classes is representative of all of said screened securities of the corresponding asset class to which said at least one security belongs;

recording said subset of said screened securities; and selecting a new subset of said screened securities when there is a change in said investment portfolio and utilizing said recorded subset of said screened securities and said new subset of said screened securities to determine said benchmark, such that said benchmark is representative of the dynamic investment portfolio over time.

20. A customized dynamic benchmark for an individual investment portfolio, comprising:

utilizing a computerized system to perform the following steps:

generating a current component and a historical component to provide a portfolio that is dynamic with respect to changes in said individual investment portfolio over time each of said historical component and current component comprising:

a plurality of asset classes each asset class selected based upon said individual investment portfolio, each asset class comprising at least one security;

each said at least one security being selected from a corresponding group of screened securities;

each said group of screened securities being screened from all available securities in a corresponding one asset class of said plurality of asset classes;

each said group of screened securities being screened by sector, maturity period, and credit quality;

each said at least one security being selected by issue size, geographic distribution, and amount outstanding and being-selected based on efficiencies determined for screened securities in the corresponding group of screened securities of a corresponding said asset class during a time period in which said investment portfolio has a first security composition;

recording said selected securities; and selecting new selected securities when one of said investment securities is added to or sold from said investment portfolio and utilizing said selected new securities and said recorded securities to provide a benchmark for said investment portfolio whereby said benchmark tracks changes in said investment portfolio, whereby said benchmark is dynamic over time to provide an accurate benchmark for an investment portfolio in which investments change over time.

21. The benchmark of claim 20, comprising:

selecting said plurality of asset classes in said benchmark portfolio to indicate a benchmark investment return comparable to an investment return of the allocation of assets in said investment portfolio.

22. The benchmark of claim 21, wherein:

said benchmark investment return is determined by:

identifying one security in a selected one of said plurality of asset classes as matured;

valuing said matured security as cash in a sweep account until a predetermined event; and allocating the value of said matured security into one of said plurality of asset classes.

23. The benchmark of claim 20, wherein:

the plurality of asset classes in the benchmark portfolio is dynamically allocated based on a change of assets in the investment portfolio;

the plurality of asset classes in the benchmark portfolio is dynamically reallocated based on an additional change of assets in the investment portfolio.

24. The benchmark of claim 23, wherein:

said reallocation of said plurality of asset classes in said benchmark portfolio is recorded in a history.

25. The benchmark of claim 23, wherein:

an investment return for said benchmark portfolio is based said reallocation of said plurality of asset classes.

26. A system for providing a customized dynamic benchmark for an individual investment portfolio, comprising:

a processor; and a memory storing a database of stored asset classes, an allocation history of the asset classes;

a memory storing a database of asset classes, and a dynamic allocation history of the asset classes; and a software program operable with said processor to execute the following functions;

identifying asset classes;

selecting a subset of said asset classes based upon investment assets in said investment portfolio;

screening securities within said subset of said asset classes;

identifying efficiencies for representative securities in each said asset class;

identifying preferred numbers of representative securities for each asset class in said subset of said asset classes, each of said preferred number is based on said efficiencies of corresponding securities in the corresponding asset class;

selecting securities in accordance with said preferred numbers of said screened securities for each asset class for use in providing a customized benchmark portfolio, whereby performance of said individual investment portfolio is benchmarked with a customized benchmark;

recording said selected securities;

selecting new selected securities when one of said investment securities is added to or sold from said investment portfolio and utilizing said selected new securities and said recorded securities to provide a benchmark for said investment portfolio whereby said bench mark tracks changes in said investment portfolio; and selecting asset classes from said database of stored asset classes based on said allocation history of said asset classes to determine an investment return for said benchmark portfolio.

27. The system of claim 26, comprising:

a link coupling said processor to the world wide web, said processor and said software program being responsive to communications received over said link to dynamically customize said benchmark portfolio.

* * * * *